Oct. 20, 1931.   H. R. VAN DEVENTER   1,828,693
APPARATUS FOR MOLDING ICE
Filed Sept. 15, 1926
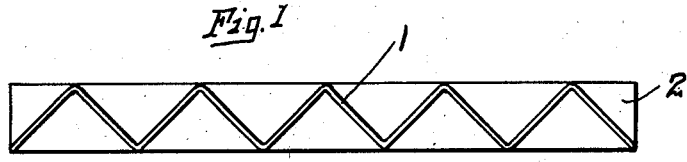
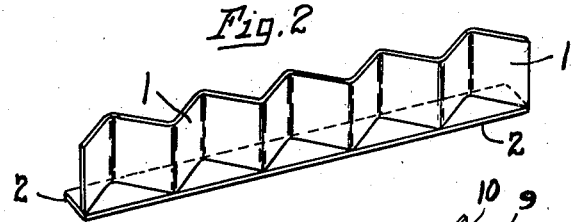
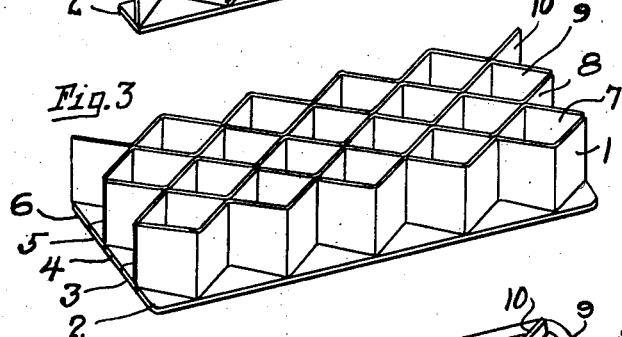
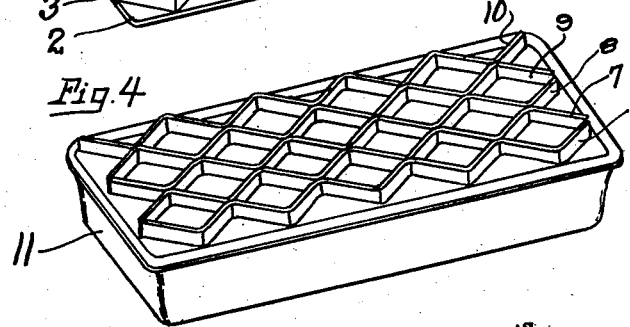
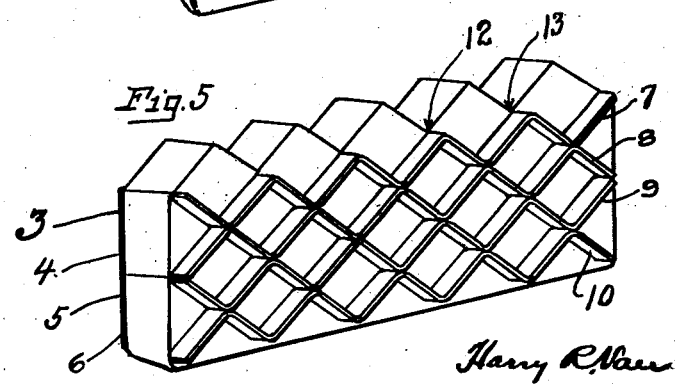
INVENTOR.
Harry R. Van Deventer, Patented Oct. 20, 1931

1,828,693

UNITED STATES PATENT OFFICE

HARRY R. VAN DEVENTER, OF NEW YORK, N. Y., ASSIGNOR, BY MESNE ASSIGNMENTS, TO INLAND MANUFACTURING COMPANY, OF DAYTON, OHIO, A CORPORATION OF DELAWARE

APPARATUS FOR MOLDING ICE

Application filed September 15, 1926. Serial No. 135,496.

My invention relates to a method and apparatus for molding substances and more particularly for molding congealable liquids.

For convenience my invention is illustrated and will be described as applied to molds for ice and like substances and is shown in a form particularly adapted for use in conjunction with electrically operated refrigerating machines such as are now commonly used in homes, shops, etc. Such machines are now provided with arrangements whereby during the operation of the machine cubes of ice are frozen in convenient drawer-like receptables. Great difficulties have been encountered in removing the ice from such receptacles.

One object of my invention is to provide a method of producing forms of ice or similar substances and a mold adapted to facilitate the removability of the frozen substance therefrom.

Another object of my invention is to provide apparatus of the above character adapted to withstand the severe handling such apparatus is commonly given, and which will eliminate the hazard of injuring the apparatus and the hands when removing the frozen substance from the molds.

A further object of my invention is to provide an ice drawer assembly which may be easily and cheaply manufactured and which is rugged and durable in service as well as convenient to use.

A still further object of my invention is to provide a partition for ice drawers that are now in commercial use which will be suitable for sale as a separate entity thereby enabling my improved method and apparatus to be used on existing refrigerating machines.

In the accompanying drawings,—

Figure 1 is a top plan view of a partition unit used with my invention;

Fig. 2 is a perspective of the partition of Fig. 1;

Fig. 3 is a perspective of a group of the strips shown in the preceding figures assembled to form cubes;

Fig. 4 is a well known type of ice drawer equipped with the assembly of strips shown in Fig. 3 and filled with water or ice;

Fig. 5 illustrates the group of strips of Fig. 4 removed from the drawer after ice cubes have been formed, and shows the block after one layer of cubes has been removed.

Heretofore, the method of forming ice cubes has been to provide a mold or ice drawer such as shown in the patent to Arnold No. 1,523,098, and having a removable section comprising a plurality of partitions or strips secured together in a criss cross arrangement similar to an egg crate (the edges only of the vertical partition strips touching the bottom of the drawer) filling the drawer with water, placing the filled drawer in the ice machine and freezing the water. When it is desired to remove the ice cubes, the drawer is taken from the machine and heated (usually by the application of water) to release the block of ice containing the partition section frozen therein. Pressure is then applied to the individual cubes usually by the fingers and if there has not been sufficient thawing along the sides of the several partitions more pressure is required than can be exerted with the fingers. Frequently, the fingers and hands are seriously injured. At other times difficulty is experienced in removing the block from the drawer and an ice pick is used with resultant damage to the drawer and partitions.

Furthermore, much ice is wasted as it is necessary to thaw an appreciable part of all the ice in contact with the bottom and side walls of the drawer and the walls or partitions. The partitions standing in the drawer have only thin edges in contact with the bottom and sides of the drawer so that it is difficult to conduct enough heat into them to free them from the ice. In instances when ice picks are used to dig the cubes out of the drawers and holes are punched therein, the drawer is thereafter useless. In addition, the ice is broken in fragments.

The foregoing difficulties are obviated by my invention which I shall now describe.

The numerals 1, 7, 8, 9 and 10 denote vertical metallic partition strips, preferably of tinned brass or copper, respectively mounted upon bottom strips 2, 3, 4, 5 and 6 arranged at right angles to the upright partitions. The partition strip 1 and its attached bottom strip 2, for example, form a unit as shown in Figs. 1 and 2, being substantially of inverted T-shaped cross section.

Sufficient of these strips may be assembled to fill an ice drawer 11 of any size and these strips may be disposed therein as shown in Figs. 3 and 4 so as to provide square shaped spaces between the strips and triangular shaped spaces along the sides of the drawer.

It will be noted that the bottom strip of each unit is in close contact with the bottom of the drawer thus giving a broad surface for the partition strip so as to readily transmit heat to and from the bottom of the drawer. Furthermore, only a thin film of ice can form between the bottom of the drawer and the bottom of the partition strips which film is easily melted as will be hereinafter pointed out.

The drawer may now be filled with water and the water frozen in the usual manner. During the freezing period it will be observed that the bottom strips being in contact with the bottom of the drawer serve to conduct heat out of the vertical partition strips and the water in contact therewith and consequently the freezing of the water is expedited as compared with what occurs when vertical strips only are used without the conducting bottom strips as described above.

After the water is frozen and it is desired to remove the ice from the drawer, it may be left face downward for a few moments or the drawer may be dipped in water. The heat is readily transmitted from the metal of the drawer to the bottom strips in contact therewith melting the thin film of ice therebetween so that the entire contents of the drawer are readily removed therefrom in a block as shown in Fig. 5.

Thereafter, the strips are readily removed by (a) Heating the bottom strips of the block shown in Fig. 5, (the heat is readily transmitted from the bottom strips up through the vertical partition strips freeing them from the ice) or (b) A slight pressure is applied to the ends of the block Fig. 5 whereupon each strip is readily separated from the main block, carrying therewith the cubes of ice supported thereby. This can be done because the strips of my invention are not united by cross partitions and the vertical partitions do not run across the entire block as heretofore. Each ice cube is united to the adjacent cube only by a thin edge of ice as indicated at 12, 13. which thin edge of ice is easily broken if not already melted.

When a complete strip of ice cubes is broken off the main block, the individual ice cubes are freed therefrom by merely pushing each cube out of contact with the strip or by flexing or bending the entire strip whereupon the ice cubes readily drop therefrom.

The ice block that is not used is returned to the drawer together with the partitions separated therefrom, the drawer is filled with water and returned to the machine for the further formation of ice cubes as described above.

If all the ice cubes in one drawer are desired at one time the block, after being removed from the drawer, may be held at the ends in an inverted position and the thumbs of each hand slightly pressed at the center of the block tending to flex the entire block in the direction of the partitions which will cause the entire block to collapse releasing all the cubes simultaneously.

From the foregoing description it will be seen that by my method of construction and assembly an improved method of making ice cubes results and that I have further developed a specific form of apparatus to carry out this method.

Modifications may be made in the arrangement and location of parts within the spirit and scope of my invention and such modifications are intended to be covered by the appended claims.

I claim:

1. In ice making apparatus, a receptacle for ice, and a removable partition therein having a substantially inverted T-shaped cross section.

2. In ice making apparatus, a receptacle for ice, a plurality of removable partitions therein of substantially inverted T-shaped cross section adapted to provide between themselves spaces for the formation of ice units, and the bottom of the inverted T-shaped members being in contact with the bottom of the receptacle.

3. In ice making apparatus, a receptacle for ice, and a plurality of removable strips each having a broad base and an upright portion forming a partition in said receptacle said upright portions being so shaped and disposed as to cooperate to divide the space in the receptacle both longitudinally and horizontally.

4. In ice making apparatus, a receptacle, a plurality of strips running across said receptacle and covering substantially all of the bottom thereof, and upright members upon said strips dividing said receptacle, for the purposes set forth.

5. A partition for ice drawers comprising a flexible bottom strip, a flexible dividing strip carried thereby said partition strip adapted to form with the drawer a plurality of ice mold spaces of which said bottom strip forms the bottom.

6. A mold for congealable liquids comprising a container and a plurality of partitions extending in one direction in said container and each partition comprising a bottom portion and an irregularly shaped portion, the bottom portions substantially joining each other and the irregular portions cooperating with each other to form a plurality of individual molds whereby the contents of each mold is joined to the next by a thin film of congealed liquid and the group of molds is united to said container by a thin film of congealed liquid.

7. In combination, an ice tray, a removable partition in said tray, said partition comprising a base portion and a zigzag upright portion fastened to said base.

8. An ice drawer for use with mechanical refrigerators which comprises a receptacle, and a plurality of flexible partition strips having bottom members thereon arranged to cover the entire bottom of the receptacle and also having vertically extending deformed members.

9. An ice drawer for use with mechanical refrigerators comprising a receptacle and a flexible partition extending in one direction in said container, the partition being irregularly shaped so as to divide the receptacle into a plurality of smaller ice units.

10. A receptacle for the production of frozen fluid in mechanical refrigerators consisting of a metal pan, and a removable partition within said pan, said partition being formed to separate the space within said pan into a plurality of compartments substantially triangular in shape.

11. In ice making apparatus, the combination with a receptacle adapted to contain the ice, of a flexible removable partition therein, said partition being of such shape that it may be flexed to remove the ice therefrom without putting the ice under compression.

12. An ice freezing tray adapted for use with domestic refrigerators which comprises a receptacle for containing water and a removable partition therein of resilient sheet metal bent to zigzag form for dividing the frozen ice into blocks of suitable size for table use.

13. An ice freezing tray adapted for use with domestic refrigerators which comprises a receptacle for containing water and a partition therein of resilient sheet metal bent to zigzag form for dividing the frozen ice into blocks of suitable size for table use.

14. An ice freezing container comprising, a receptacle for containing the water and a removable flexible metal dividing wall therein, said wall having alternate reverse turns therein.

15. An ice freezing container comprising, a receptacle for containing water and a removable sheet metal member therein, said member being bent to such form that it may be flexed to remove the ice therefrom without putting the ice under compression.

16. An ice freezing tray adapted for use with domestic refrigerators which comprises a receptacle for containing water and a removable resilient partition therein for dividing the ice into separate blocks, said partition being of such special shape as to materially increase the flexibility thereof beyond the inherent flexibility of the material thereof to facilitate the removal of the frozen ice blocks therefrom.

17. An appliance for freezing water into individual blocks suitable for use in a drinking glass, comprising a container and a removable partition therein for dividing the space in the container into a plurality of mold units, said partition being made of a single piece of sheet material bent to provide a plurality of walls defining each mold unit, the walls of each unit being capable of being concurrently distorted whereby the freeing of the block from the mold unit is facilitated due to the displacement of said distortable walls relative to the adjacent surfaces of said block.

18. In a sharp freezing container, a removable main wall shaped to form compartments, two of the walls of a compartment being integral and so shaped that said walls will move relative to each other upon flexing the main wall.

19. In a sharp freezing container, a main wall having laterally projecting portions forming ice block compartments, two opposite walls of every compartment being shaped to spread apart upon flexing said main wall about an axis substantially at right angles to said wall.

20. A sharp freezing container comprising a sinuous flexible sheet within the container for dividing the same into compartments whereby to facilitate the removal of the ice from said compartments.

In testimony whereof I have affixed my signature.

HARRY R. VAN DEVENTER.